A. GROSSMANN.
GOVERNOR FOR SPEED INDICATORS.
APPLICATION FILED JUNE 27, 1908.

941,516.

Patented Nov. 30, 1909.

Witnesses:
C. H. Crawford
C. Huymann

Inventor:-
Alexander Grossmann
by B. Singer
Attorney

UNITED STATES PATENT OFFICE.

ALEXANDER GROSSMANN, OF DRESDEN, GERMANY.

GOVERNOR FOR SPEED-INDICATORS.

941,516.  Specification of Letters Patent.  Patented Nov. 30, 1909.

Application filed June 27, 1908. Serial No. 440,653.

*To all whom it may concern:*

Be it known that I, ALEXANDER GROSSMANN, residing in the German Empire, in the Kingdom of Saxony, Dresden, Germany, 26 Chemnitzerstrasse, have invented certain new and useful Improvements in or Relating to Governors for Speed-Indicators.

This invention relates to speed-indicators for vehicles more particularly to speed-indicators the driven parts of which are at intervals of time uncoupled from the driving parts and braked.

The invention consists in providing means for mechanically actuating the uncoupling and brake mechanism from the driving shaft without the use of clockwork, instead of as heretofore by means of clockwork which effects the uncoupling mechanically or by closing an electric circuit. The working of clockwork is deleteriously affected when the uncoupling is mechanically performed, and electromagnetic actuating means, though otherwise very advantageous, have the disadvantage that the vehicle must carry a source of electromotive force.

The present invention obviates these disadvantages and according thereto the uniform rotation of the shaft which effects the uncoupling is produced by means of the non-uniformly rotating main shaft or axle with the aid of a self-braking centrifugal governor so connected to the driving friction clutch that it is adapted to retard the driven clutch-member relatively to the driving member.

A construction embodying the invention is shown in the annexed drawing, in which—

Figure 1:
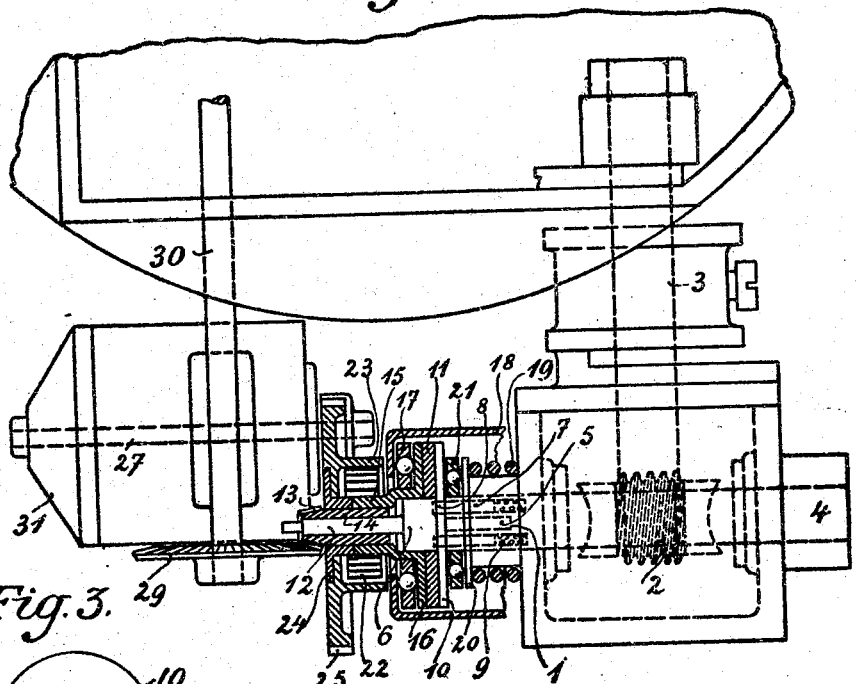
Figure 3:
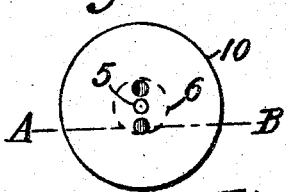
Figures 2, 4:
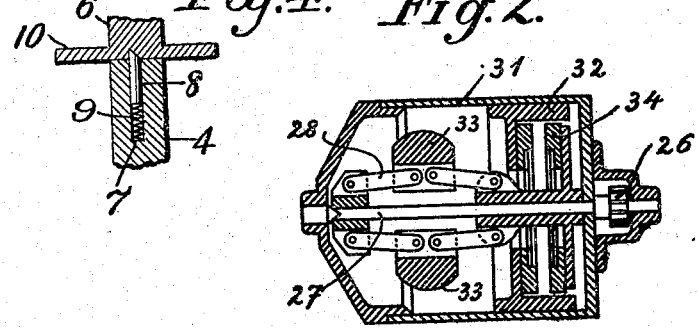

Figure 1 is an elevation of the apparatus, partly in section, and Fig. 2 a section of the governor, Fig. 3 is a detail view seen from the right of Fig. 1 and Fig. 4 is a horizontal sectional view on line A—B of Fig. 3.

The shaft 4 connects the apparatus to the axle of the vehicle. The shaft 3 is driven by the shaft 4 and worm 2 to operate the pointer of the speed-indicator. The shaft 30 actuates a device for uncoupling the pointer.

The end of the shaft 4 has a recess 1 serving as a bearing for the journal 5 of a stepped cylindrical extension 6. Spring actuated pins 8 entering holes in the shaft 4 cause the extension 6 to rotate with said shaft 4. Since the protruding ends of the pins and the corresponding abutment surfaces in the extension 6 are straight on one side but beveled on the other, the shaft 4 only rotates the part 6 in one direction. Against the flange 10 of the extension 6 abuts a disk 11 of leather or the like. On the boss 12 of the extension is loosely mounted a toothed wheel 13 with a long hub 14, on which there is loosely mounted a sleeve 15. The latter has a flange 16 abutting against the leather disk 11. The flange 10 and leather disk on the one hand, and the flange 16 on the other hand, form respectively the driving and driven elements of a friction clutch. The flange 16 is supported at the rear by a ball-bearing 17 and cap 18. The flange 10 is continuously acted on by a spring 19 which thrusts a disk 20 and ball-bearing 21 against said flange 10. The sleeve 15 is engaged by one end of a spiral spring 22. A toothed wheel 25 and drum 23 are fixed by an angled ring 24 to the hub 14 of the toothed wheel 13. To the drum 23 is fixed the other end of the spring 22, so that the latter resiliently connects the sleeve 15 to the wheels 25 and 13. The toothed wheel 25 meshes with the pinion 26 (Fig. 2) of a centrifugal governor 28 mounted on a horizontal shaft 27. The toothed wheel 13 meshes with a bevel-wheel 29 fixed to the aforesaid shaft 30.

The governor is inclosed in a casing 31 containing an adjustable abutment 32. By swinging outward, the weights 33 pull a disk 34 against this abutment. The latter and the disk have renewable friction-surfaces and the friction between them so retards the rotation of the weights that the throw of the latter is considerably reduced. This reduction of throw causes disk 34 to become disengaged from abutment 32 and thus the governor is again free to rotate. This automatic braking and starting of the governor causes uniform rotation of the pinion 26, toothed wheels 13 and 29, and shaft 30, since when the speed tends to become too great the brake effect retards flange 16 by reason of the retardation of the governor being transmitted by wheel 25, drum 23 and spring 22 to said flange, thus causing it to slip, and when the speed falls down to within the predetermined limit the retardation of the governor and the slipping of the clutch ceases.

What I claim is:—

1. In a speed indicator the combination with a shaft, a non-uniformly rotating driving member, a friction clutch interposed between said driving member and shaft, and having driving and driven elements a self braking centrifugal governor, and means for resiliently gearing the driven element of the clutch to said governor, said governor including means whereby uniform rotation is imparted to the aforesaid shaft.

2. In a speed indicator the combination with a shaft, a non-uniformly rotating driving member, a friction clutch comprising driving and driven elements interposed between said driving member and shaft, means comprising beveled pins and beveled coacting surfaces whereby the driven clutch element is actuated by rotation of the driving element in one direction only, a self braking centrifugal governor, and means for resiliently gearing the driven element of the clutch to said governor, said governor including means whereby uniform rotation is imparted to the aforesaid shaft.

3. In a speed indicator the combination with a shaft, a non-uniformly rotating driving-member, a friction clutch and gearing interposed between said driving member and shaft, said clutch comprising driving and driven elements, a self braking centrifugal governor, a sleeve carried by the driven clutch element, gearing interposed between the clutch and governor, and a spring connecting said sleeve and one element of said gearing, said governor including means, whereby uniform rotation is imparted to the aforesaid gearing for actuating said shaft.

4. In a speed indicator the combination with a shaft, a non-uniformly rotating driving member, a friction clutch comprising driving and driven elements, gearing interposed between said driving member and shaft for actuating the latter, means whereby the driven clutch element is actuated by rotation of the driving element in one direction only, a self braking centrifugal governor comprising a horizontal spindle and weights carried thereby, and means for resiliently gearing the driven element of the clutch to said governor spindle, said governor including means whereby uniform rotation is imparted to the aforesaid gearing for actuating said shaft.

5. In a speed indicator the combination with a shaft, a non-uniformly rotating driving-member, a friction clutch comprising driving and driven elements, gearing interposed between said driving member and shaft for actuating the latter, a self braking centrifugal governor comprising a horizontal spindle and weights carried thereby, and means for resiliently gearing the driven clutch element to the governor spindle, said governor including means comprising a stationary friction disk and a movable friction disk operated by the governor weights to coact with said stationary disk whereby uniform rotation is imparted to the aforesaid gearing for actuating said shaft.

6. In a speed indicator the combination with a shaft, a non-uniformly rotating driving member, a friction clutch comprising driving and driven elements, gearing interposed between said driving member and shaft for actuating the latter, means whereby the driven clutch element is actuated by rotation of the driving element in one direction only, a self braking centrifugal governor comprising a horizontal spindle and weights carried thereby, and means for resiliently gearing the driven element of the clutch to said governor spindle, said governor including means comprising a normally stationary adjustable friction disk, and a movable friction disk operated by the governor weights to engage said stationary disk for braking whereby uniform rotation is imparted by the governor spindle to the aforesaid gearing for actuating said shaft.

In witness whereof I have hereunto set my hand in presence of two witnesses.

ALEXANDER GROSSMANN

Witnesses:
 KARL STEYER,
 PAUL ARRAS.